United States Patent
Davis et al.

[11] Patent Number: 6,143,446
[45] Date of Patent: *Nov. 7, 2000

[54] BATTERY CATHODE

[75] Inventors: Stuart M. Davis, Norfolk; Alexander A. Leef, Waltham, both of Mass.; Sandrine Colson, Paris, France; Hana Strunc, Roslindale, Mass.

[73] Assignee: Duracell Inc., Bethel, Conn.

[*] Notice: This patent issued on a continued prosecution application filed under 37 CFR 1.53(d), and is subject to the twenty year patent term provisions of 35 U.S.C. 154(a)(2).

[21] Appl. No.: 09/176,500

[22] Filed: Oct. 21, 1998

[51] Int. Cl.⁷ ................................................. H01M 4/50
[52] U.S. Cl. ................................................. 429/224; 429/229
[58] Field of Search ............................. 429/224, 229, 429/232

[56] References Cited

U.S. PATENT DOCUMENTS

| | | | |
|---|---|---|---|
| 4,041,220 | 8/1977 | Armand | 429/224 X |
| 4,167,609 | 9/1979 | Scarr | 429/206 |
| 4,271,243 | 6/1981 | Broussely et al. | 429/194 |
| 4,304,828 | 12/1981 | Vaidyanathan | 429/206 |
| 4,330,602 | 5/1982 | O'Rell et al. | 429/206 |
| 4,336,315 | 6/1982 | Eda et al. | 429/194 |
| 4,366,215 | 12/1982 | Coetzer et al. | 429/199 |
| 4,465,747 | 8/1984 | Evans | 429/194 |
| 4,478,921 | 10/1984 | Langan | 429/194 |
| 4,555,457 | 11/1985 | Dhanji | 429/199 |
| 4,925,747 | 5/1990 | Kordesch et al. | 429/59 |
| 5,026,617 | 6/1991 | Kosaka et al. | 429/206 |
| 5,108,852 | 4/1992 | Tomantschger et al. | 429/66 |
| 5,187,033 | 2/1993 | Koshiba | 429/194 |
| 5,192,628 | 3/1993 | Fritz et al. | 429/190 |
| 5,204,195 | 4/1993 | Tomantschger et al. | 429/59 |
| 5,206,096 | 4/1993 | Goldstein et al. | 429/27 |
| 5,281,497 | 1/1994 | Kordesch et al. | 429/224 |
| 5,336,571 | 8/1994 | Tomantschger et al. | 429/66 |
| 5,340,666 | 8/1994 | Tomantschger et al. | 429/59 |
| 5,342,712 | 8/1994 | Mieczkowska et al. | 429/224 |
| 5,346,783 | 9/1994 | Tomantschger et al. | 429/66 |
| 5,389,469 | 2/1995 | Passaniti et al. | 429/206 |
| 5,389,471 | 2/1995 | Kung | 429/206 |
| 5,391,365 | 2/1995 | Wang et al. | 423/605 |
| 5,429,895 | 7/1995 | Lian et al. | 429/223 |
| 5,466,543 | 11/1995 | Ikoma et al. | 429/59 |
| 5,501,924 | 3/1996 | Swierbut et al. | 429/224 |
| 5,514,490 | 5/1996 | Chen et al. | 429/191 |
| 5,532,085 | 7/1996 | Davis et al. | 429/224 |
| 5,541,021 | 7/1996 | Watanabe et al. | 429/206 |
| 5,556,720 | 9/1996 | Charkey | 429/59 |
| 5,569,563 | 10/1996 | Ovshinsky et al. | 429/223 |
| 5,569,564 | 10/1996 | Swierbut et al. | 424/224 |
| 5,571,600 | 11/1996 | Licht | 429/188 |
| 5,580,681 | 12/1996 | Fleischer | 429/192 |
| 5,599,644 | 2/1997 | Swierbut et al. | 429/224 |
| 5,705,291 | 1/1998 | Amatucci et al. | 429/137 |
| 5,744,266 | 4/1998 | Nunome et al. | 429/224 |
| 5,856,040 | 1/1999 | Newman et al. | 429/224 X |
| 5,895,734 | 4/1999 | Nardi et al. | 429/224 |

FOREIGN PATENT DOCUMENTS

| | | |
|---|---|---|
| 0 802 574 A1 | 10/1997 | European Pat. Off. . |
| 0 863 561 A1 | 9/1998 | European Pat. Off. . |
| 47-18690 | 7/1972 | Japan . |
| 52-19658 | 5/1977 | Japan . |
| 52-61731 | 5/1977 | Japan . |
| 53-133734 | 11/1978 | Japan . |
| 58-32361 | 2/1983 | Japan . |
| 58-121550 | 7/1983 | Japan . |
| 58-163159 | 9/1983 | Japan . |
| 60-84768 | 5/1985 | Japan . |
| 2-86059 | 3/1990 | Japan . |

*Primary Examiner*—Maria Nuzzolillo
*Assistant Examiner*—Susy Tsang
*Attorney, Agent, or Firm*—Fish & Richardson P.C.

[57] ABSTRACT

A cathode that includes manganese dioxide and a titanium oxy salt, preferably titanium oxy sulfate, is disclosed.

12 Claims, 1 Drawing Sheet

BATTERY CATHODE

BACKGROUND OF THE INVENTION

The present invention relates to batteries.

Batteries, such as alkaline batteries, are commonly used as energy sources. Generally, alkaline batteries have a cathode, an anode, a separator and an alkaline electrolyte solution. The cathode is typically formed of manganese dioxide, carbon particles, alkaline electrolyte solution, and a binder. The anode can be formed of a gel including alkaline electrolyte solution and zinc particles. The separator is disposed between the cathode and the anode. The electrolyte solution, which is dispersed throughout the battery, can be a hydroxide solution such as potassium hydroxide.

SUMMARY OF THE INVENTION

The invention relates to batteries, such as alkaline batteries, having cathodes that include manganese dioxide and a titanium oxy salt, preferably titanium oxy sulfate ($TiOSO_4$) These batteries have good performance characteristics. For example, the batteries perform well in applications involving intermittent drains such as toys (IEC Test @ 3.9 Ohms, 1 hour/day), flashlights (IEC and ANSI Tests @ 3.9 Ohms, 4 minutes/hour, 8 hours/day) and tape recorders (IEC Test @ 6.8 Ohms, 1 hour/day). The batteries can have various industry standard sizes, such as AA, AAA, AAAA, C or D. In one aspect, the invention features a cathode that includes manganese dioxide and a titanium oxy salt.

In another aspect, the invention features an electrochemical cell including a cathode, an anode and a separator disposed between the cathode and the anode. The cathode includes manganese dioxide and a titanium oxy salt.

Preferred embodiments include one or more of the following features. The titanium oxy salt is titanium oxy sulfate ($TiOSO_4$). The cathode includes from 0.1% to 5% of the titanium oxy salt based on the total weight of active cathode material. The cathode further includes conductive particles.

Other features and advantages of the invention will be apparent from the description of the preferred embodiments thereof and the claims.

BRIEF DESCRIPTION OF THE DRAWING

The FIGURE is a cross-sectional view of a battery.

DESCRIPTION OF THE PREFERRED EMBODIMENTS

Figure 1:
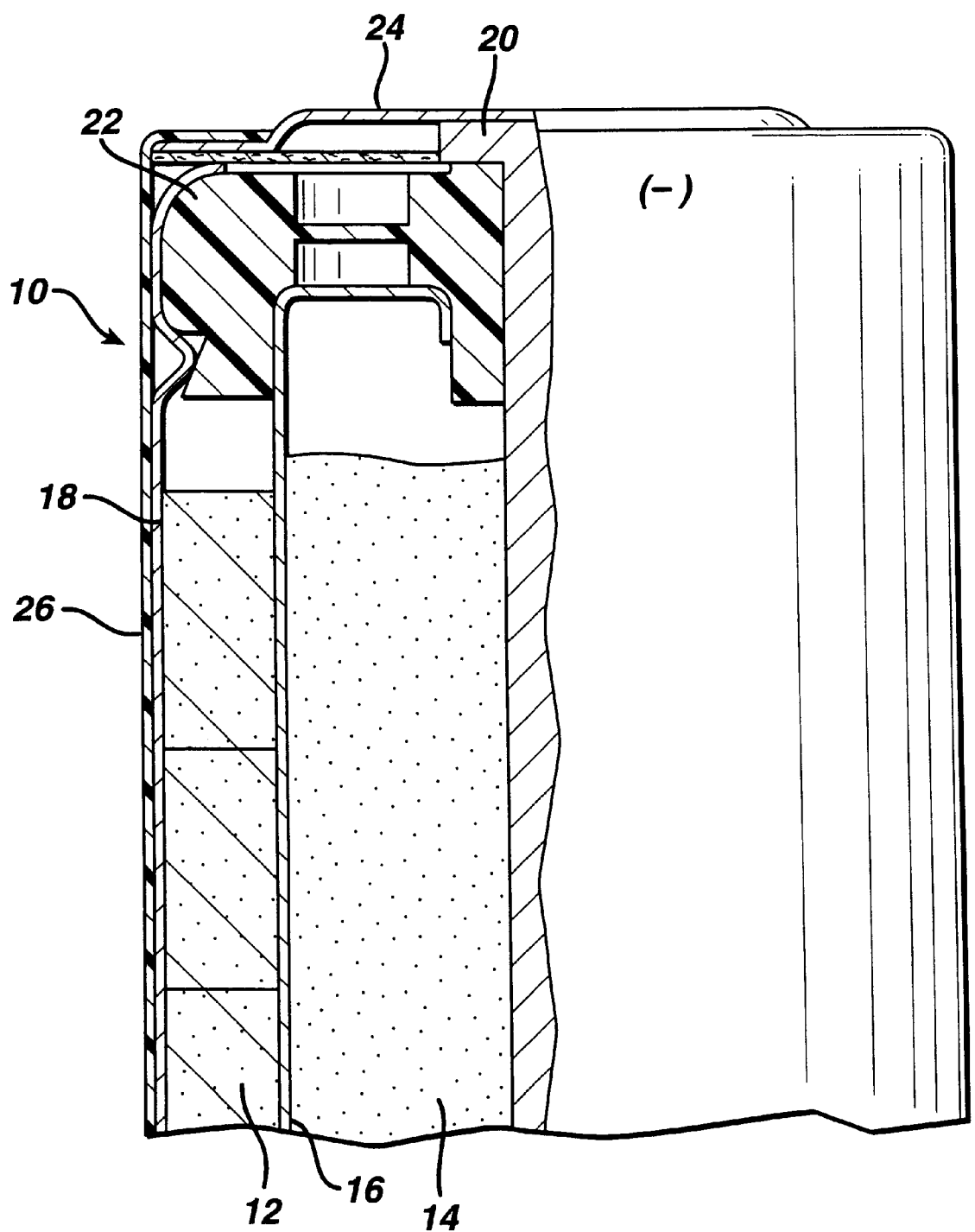

The preferred batteries are alkaline batteries that have a cathode formed of manganese dioxide, conductive particles selected from the group consisting of carbon, graphite, and mixtures thereof, a titanium oxy salt, e.g., $TiOSO_4$, and optionally a quantity of alkaline electrolyte and a binder.

Referring to the figure, a battery 10 is shown that has a cathode 12, an anode 14, a separator 16, an outer wall 18 that contacts the outer diameter of cathode 12, and an insulating layer 26. Battery 10 further includes an anode collector 20 that passes through a seal member 22 and into anode 14. The upper end of anode collector 20 is connected to a negative end cap 24 which serves as the negative external terminal of battery 10. Layer 26 can be formed of an electrically nonconducting material, such a heat shrinkable plastic. In addition, an electrolyte solution is dispersed throughout battery 10.

Cathode 12 can be a single pellet of material. Alternatively, cathode 12 can be formed of a number of cathode pellets that are stacked on top of each other. In either case, the cathode pellets can be made by first mixing the manganese dioxide, the conductive particles the titanium oxy salt, and optionally the electrolyte solution and the binder. For embodiments in which more than one pellet is used, the mixture can be pressed to form the pellets The pellet(s) are fit within battery 10 using standard processes. For example, in one process, a core rod is placed in the central cavity of battery 10, and a punch is then used to pressurize the top most pellet. When using this process, the interior of wall 18 can have one or more vertical ridges that are spaced circumferentially around wall 18. These ridges can assist in holding cathode 12 in place within battery 10.

In embodiments in which cathode 12 is formed of a single pellet, the powder can be placed directly within battery 10. A retaining ring is set in place, and an extrusion rod passes through the ring, densifying the powder and forming cathode 12.

The cathode 12 includes manganese dioxide, graphite and/or carbon particles, and a titanium oxy salt. Suitable titanium oxy salts are those that extend the useful life of the battery by modifying the discharge process and products in the cathode when included in a battery cathode. A preferred titanium oxy salt is $TiOSO_4$, commercially available from Aldrich Chemical as Product No. 33,398-0. Other suitable titanium oxy salts include $La_2Ti_4O_4(SO_4)_7$, delta $Ti_2O_{1.3}(PO_4)_{1.6}$, $(TiO)_2P_2O_7$, $Cd_2TiNbO_6F$, $PbBi_2TiNbO_8F$, $\alpha$-$SrTiOF_4$, $Na_{(1-x)}Zn_xTi_2O_6F_{1.8}$, $TiOCl_2$, $CaTi_2O_4(OH)_2$, $VTiO_3(OH)$, $CeTi_2(O,OH)_6$. The titanium salt is preferably included in an amount of from about 0.1 to 5 weight percent based on the total weight of active material in the cathode. If more of the titanium salt is used low drain performance is reduced due to dilution of $MnO_2$, while if less of the titanium salt is used there is little effect on battery performance.

Any of the conventional forms of manganese dioxide for batteries can be used such as EMD or CMD. Distributors of such manganese dioxide include Kerr McGee, Co., Broken Hill Proprietary, Chem Metals, Co., Tosoh, Delta Manganese, Mitsui Chemicals, JMC, Sedema and Chuo Denki.

The conductive particles are selected from the group consisting of carbon powder, graphite, and mixtures thereof. Suitable conductive particles are those that impart conductivity to the cathode material without deleteriously affecting the other properties of the battery. The cathode preferably contains from about 4 to 15 percent of the conductive particles based on the total weight of active cathode material. Higher levels may undesirably reduce the amount of active material in the battery, while lower levels may not impart sufficient conductivity.

In some embodiments, cathode 12 may further include an addition of electrolyte solution and/or a binder. Electrolyte solutions are discussed below. Examples of binders for cathode 12 include polyethylene powders, polyacrylamides, Portland cement and fluorocarbon resins, such as PVDF and PTFE. In certain embodiments, cathode 12 includes a polyethylene binder sold under the tradename coathylene HA-1681 (Hoechst). When cathode 12 includes a binder, the binder preferably makes up less than about 1 weight percent of cathode 12, more preferably from about 0.1 weight percent to about 0.5 weight percent of cathode 12, and most preferably about 0.3 weight percent of cathode 12.

Cathode 12 can include other additives. Examples of these additives are disclosed in U.S. Pat. No. 5,342,712, which is hereby incorporated by reference.

In certain embodiments, a layer of conductive material can be disposed between the can wall 18 and cathode 12.

This layer may be disposed along the inner surface of wall 18, along the outer circumference of cathode 12 or both. Typically, this conductive layer is formed of a carbonaceous material and, optionally, a binder. Such materials include LB1000 (Timcal), Eccocoat 257 (W.R. Grace & Co.), Electrodag 109 (Acheson Industries, Inc.), Electrodag 112 (Acheson) and EB005 (Acheson). Methods of applying the conductive layer are disclosed in, for example, Canadian Patent No. 1,263,697, which is hereby incorporated by reference.

Using a conductive layer, especially Electrodag 109 or EB005, between wall 18 and cathode 12 can reduce the pressure required when forming cathode 12 within battery 10. Thus, the density of cathode 12 can be made relatively high without causing the pellet(s) to be crushed or crack when forming cathode 12 within battery 10. However, if the density of cathode 12 is too high, an insufficient amount of electrolyte solution can be dispersed within cathode 12, reducing the efficiency of battery 10. For example, for a typical C size battery, cathode 12 has a porosity of from about 18% to about 28%, more preferably from about 22% to about 27%, and most preferably about 25%. Here, porosity means the space available for electrolyte expressed as a volume percentage of the total geometric cathode volume. Thus, the porosity may be partially or totally filled with electrolyte.

Anode 14 can be formed of any of the standard zinc materials used in battery anodes. Often, anode 14 is formed of a zinc slurry that includes zinc metal particles, alkaline electrolyte, a gelling agent and minor amounts of additives, such as metal plating, inorganic and organic gassing inhibitors.

Gelling agents that can be used in anode 14 include polyacrylic acids, grafted starch materials, polyacrylates, salts of polyacrylic acids, carboxymethylcellulose or sodium carboxymethylcellulose or combinations thereof. Examples of such polyacrylic acids are Carbopol 940 (B.F. Goodrich) and Polygel 4P(3V), and an example of a grafted starch material is Waterlock A221 (Grain Processing Corporation, Muscatine, Iowa). An example of a salt of a polyacrylic acid is Alcosorb G1 (Allied Colloids). In some embodiments, anode 14 preferably includes from about 0.2 weight percent to about 1 weight percent total gelling agent, more preferably from about 0.4 weight percent to about 0.8 weight percent total gelling agent, and most preferably from about 0.55 weight percent to about 0.75 weight percent total gelling agent. These weight percentages correspond to when the electrolyte solution is dispersed within anode 14.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators.

The electrolyte solution dispersed throughout the battery 10 can be any of the conventional electrolyte solutions used in batteries. Typically, the electrolyte solution is an aqueous hydroxide solution. Such aqueous hydroxide solutions include, for example, potassium hydroxide solutions and sodium hydroxide solutions. In some embodiments, the electrolyte solution is an aqueous solution of potassium hydroxide including from about 30 weight percent to about 45 weight percent potassium hydroxide. The aqueous hydroxide solution may optionally contain a small quantity of dissolved zinc oxide, typically in the range of about 1 to 4 weight percent.

EXAMPLE I

Conventional primary Zn/MnO2 alkaline C cells were constructed with conventional cathode and anode active materials, electrolyte and separator membrane. The anode material was in the form of a gelled mixture containing Zn alloy powder, aqueous KOH solution, gelling agent, (acrylic acid copolymer Carbopol C940 from B.F. Goodrich), superabsorber (Waterlock A221 from Grain Processing Corp.), and surfactant (organic phosphate ester RM510 from Rhone Poulenc). The separator was a conventional electrolyte permeable polyvinyl alcohol/rayon nonwoven laminated to cellophane. The electrolyte wag an aqueous KOH solution containing about 35 wt % KOH and 2 wt % ZnO.

The cathode active material had the following composition: electrolytic manganese dioxide (84.8 wt %), graphite (8.5 wt %), polyethylene binder (0.16 wt %) and 9 N KOH solution (6.54 wt %).

Experimental C size cells were also constructed identical to the standard cells except that these contained 1.5 wt % $TiOSO_4$ and the amount of electrolytic manganese dioxide was correspondingly reduced by 1.5 wt %. The total weight of the cathodes in the Standard and Experimental cells was equal.

The Experimental cells showed a noticeable advantage over the Standard cells during discharge. The main advantage (4.5–6.5%) was seen on intermittent ANSI and IEC tests such as Toy test (3.9 Ohm, 1 hr/day), Flashlight test (3.9 Ohm, 4 min/hr, 8 hr/day) and Tape Recorder test (6.8 Ohm, 1 hr/day).

Other embodiments are within the claims.

What is claimed is:

1. An electrochemical cell, comprising:
   a cathode comprising manganese dioxide and from about 0.1 weight percent of a titanium oxy salt based on the total weight of active material in the cathode;
   an anode; and
   a separator disposed between the cathode and the anode.

2. The electrochemical cell of claim 1 wherein said titanium oxy salt is titanium oxy sulfate.

3. The electrochemical cell according to claim 1, wherein the cathode comprises from about 0.1 to 5.0 weight percent of said titanium oxy salt based on the total weight of active material in the cathode.

4. The electrochemical cell according to claim 1, wherein the electrochemical cell is an alkaline battery.

5. The electrochemical cell according to claim 1, wherein the electrochemical cell is selected from the group consisting of C batteries and D batteries.

6. The electrochemical cell according to claim 1, wherein the cathode has a porosity of from about 18% to about 28%.

7. The electrochemical cell according to claim 1, wherein the anode comprises zinc particles.

8. The electrochemical cell according to claim 1, further comprising an electrolyte solution.

9. A cathode, comprising:
   manganese dioxide; and
   from about 0.1 weight percent of a titanium oxy salt based on the total weight of active material in the cathode.

10. The cathode according to claim 9 wherein said titanium oxy salt is titanium oxy sulfate.

11. The cathode according to claim 9 wherein the cathode comprises from 0.1 to 5.0 weight percent of said titanium oxy salt based on the total active material in the cathode.

12. The cathode according to claim 9, wherein the cathode has a porosity of from about 18% to about 28%.

* * * * *

UNITED STATES PATENT AND TRADEMARK OFFICE
CERTIFICATE OF CORRECTION

PATENT NO. : 6,143,446
DATED : NOVEMBER 7, 2000
INVENTOR(S) : HANA STRUNC, ALEXANDER A. LEEF, SANDRINE COLSON AND STUART M. DAVIS

It is certified that error appears in the above-identified patent and that said Letters Patent is hereby corrected as shown below:

On the cover page, under References cited, 5,744,266 4/1998 Nunome et al., Delete "4/1998" and insert --1/1997--

5,856,040 1/1999 Newman et al., Delete "1/1999" and insert --3/1991--

5,895,734 4/1999 Nardi et al., Delete "4/1999" and insert --4/1997--

Signed and Sealed this

Eighth Day of May, 2001

*Attest:*

NICHOLAS P. GODICI

*Attesting Officer*   Acting Director of the United States Patent and Trademark Office